US009036646B2

(12) United States Patent
Kamble et al.

(10) Patent No.: US 9,036,646 B2
(45) Date of Patent: May 19, 2015

(54) DISTRIBUTED ROUTING MECHANISMS FOR A VIRTUAL SWITCH ENABLED BY A TRILL-BASED FABRIC

(75) Inventors: Keshav G. Kamble, Fremont, CA (US); Dar-Ren Leu, San Jose, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 13/528,756

(22) Filed: Jun. 20, 2012

(65) Prior Publication Data

US 2013/0343395 A1 Dec. 26, 2013

(51) Int. Cl.
| | |
|---|---|
| H04L 12/28 | (2006.01) |
| H04L 12/56 | (2006.01) |
| H04L 12/721 | (2013.01) |
| H04L 12/46 | (2006.01) |
| H04L 12/709 | (2013.01) |

(52) U.S. Cl.
CPC ............ *H04L 45/66* (2013.01); *H04L 12/4625* (2013.01); *H04L 45/245* (2013.01)

(58) Field of Classification Search
USPC .......................................... 370/328, 401, 392
See application file for complete search history.

(56) References Cited

U.S. PATENT DOCUMENTS

| | | | |
|---|---|---|---|
| 7,272,309 B1* | 9/2007 | Tamil et al. ...................... 398/47 |
| 7,398,322 B1 | 7/2008 | Perlman | |
| 7,787,480 B1 | 8/2010 | Mehta et al. | |
| 8,102,781 B2 | 1/2012 | Smith | |
| 8,125,928 B2 | 2/2012 | Mehta et al. | |
| 8,489,718 B1* | 7/2013 | Brar et al. ...................... 709/222 |
| 2004/0133690 A1* | 7/2004 | Chauffour et al. ............. 709/229 |
| 2007/0053296 A1* | 3/2007 | Yazaki et al. .................. 370/235 |
| 2010/0246388 A1* | 9/2010 | Gupta et al. ................... 370/225 |
| 2011/0019678 A1* | 1/2011 | Mehta et al. ................... 370/401 |
| 2011/0235523 A1* | 9/2011 | Jha et al. ........................ 370/242 |
| 2011/0299535 A1* | 12/2011 | Vobbilisetty et al. .......... 370/392 |
| 2012/0014386 A1* | 1/2012 | Xiong et al. ................... 370/392 |
| 2012/0014387 A1* | 1/2012 | Dunbar et al. ............ 370/395.53 |
| 2012/0281700 A1* | 11/2012 | Koganti et al. ................ 370/392 |
| 2012/0314715 A1* | 12/2012 | Janardhanan .................. 370/402 |
| 2013/0003733 A1* | 1/2013 | Venkatesan et al. ........... 370/390 |
| 2013/0003738 A1* | 1/2013 | Koganti et al. ................ 370/392 |

OTHER PUBLICATIONS

Hirotsu et al., "Dynamic and Distributed Routing Control for Virtualized Local Area Networks," 2010 IEEE, 35th Annual IEEE Conference on Local Computer Networks, pp. 212-215.

(Continued)

*Primary Examiner* — Edan Orgad
*Assistant Examiner* — Rebecca Song
(74) *Attorney, Agent, or Firm* — Zilka-Kotab, PC

(57) ABSTRACT

In one embodiment, a system includes a routing protocol engine (RPE) RBridge which includes a local uplink port configured to be coupled to a router, a local processor for executing logic, and logic configured for: receiving a data frame at the local uplink port, running routing protocols to enable L3 processing of the data frame, connecting to a LAG cluster, and configuring learned routes and routes passed from another RPE RBridge in the local processor. In more embodiments, methods for providing L3 processing in a TRILL-enabled network include receiving a data frame at a local uplink port of a RBridge enabled with a RPE to enable L3 processing, running routing protocols to provide L3 processing of the data frame, and configuring learned routes and routes passed from any other RPE RBridges. The RPE RBridge may be connected to a router or to a first server and a second server.

24 Claims, 11 Drawing Sheets

(56) References Cited

OTHER PUBLICATIONS

Touch et al., "Transparent Interconnection of Lots of Links (TRILL): Problem and Applicability Statement (RFC5556)," 2009 IETF Trust, IPCOM000183374D, May 1, 2009, 35 pages.

Eastlake 3rd et al., "Routing Bridges (RBridges): Adjacency (RFC6327)," 2011 IETF Trust, IPCOM000209002D, Jul. 1, 2011, 53 pages.

* cited by examiner

DISTRIBUTED ROUTING MECHANISMS FOR A VIRTUAL SWITCH ENABLED BY A TRILL-BASED FABRIC

BACKGROUND

The present invention relates to data center infrastructure, and more particularly, this invention relates to providing a distributed routing mechanism for a virtual switch enabled by a Transparent Interconnection of Lots of Links (TRILL)-based fabric network.

Distributed Fabric Protocol (DFP) is a method which enables multiple switches to be grouped together to form a distributed virtual switch, where DFP unifies the management plane (it is a centralized management plane). DFP utilizes TRILL as the fabric protocol to "glue" the data plane of this virtual switch via Ethernet. Since TRILL is a Layer-2 (L2) protocol, to provide multi-path support, in conventional systems, the Layer-3 (L3) support on this kind of virtual switch is troublesome. However, in these conventional systems, using external routers for L3 support results in the number of hops required for routing of the east-west traffic to be too great.

Accordingly, a system and/or method of overcoming the problems in conventional systems to allow for efficient. L3 support in a TRILL-based fabric network would be very beneficial.

SUMMARY

In one general embodiment, a system includes a first routing protocol engine (RPE) routing bridge (RBridge) which includes a local uplink port adapted to be coupled to a router, a local processor for executing logic, logic adapted for receiving a data frame at the local uplink port, logic adapted for running routing protocols to enable layer-3 (L3) processing of the data frame, and logic adapted for configuring learned routes and routes passed from another RPE RBridge in the local processor.

In another embodiment, a system includes a first RPE RBridge and a first non-RPE RBridge arranged in a link aggregation group (LAG) cluster with the first RPE RBridge. The first RPE RBridge includes a first local access port adapted to be coupled to a first server, a second local access poll adapted to be coupled to a second server, a local processor for executing logic, logic adapted for receiving a data frame at either local access port, logic adapted for running routing protocols to enable L3 processing of the data frame, and logic adapted for configuring learned routes and routes passed from another RPE RBridge in the local processor of the first RPE RBridge. The first non-RPE RBridge includes a first local access port adapted to be coupled to the first server, a second local access port adapted to be coupled to the second server, a local processor for executing logic, logic adapted for receiving a data frame at the local access port, and logic adapted for configuring learned routes and routes passed from any RPE RBridges in the local processor of the first non-RPE RBridge.

In yet another embodiment, a method for providing L3 processing in a transparent interconnection of lots of links (TRILL)-enabled network includes receiving a data frame at a local uplink port of a first RBridge enabled with a RPE to enable L3 processing, wherein the first RPE RBridge is connected to a router, running routing protocols to provide L3 processing of the data frame, and configuring learned routes and routes passed from any other RPE RBridges.

In accordance with another embodiment, a method for providing L3 processing in a TRILL-enabled network includes receiving a data frame at a first RBridge enabled with a RPE to enable L3 processing, wherein the first RPE RBridge is connected to a first server via a first local access port and to a second server via a second local access port, running routing protocols to provide L3 processing of the data frame, and configuring learned routes and routes passed from any other RPE RBridges.

Other aspects and embodiments of the present invention will become apparent from the following detailed description, which, when taken in conjunction with the drawings, illustrate by way of example the principles of the invention.

DETAILED DESCRIPTION

Figure 1:
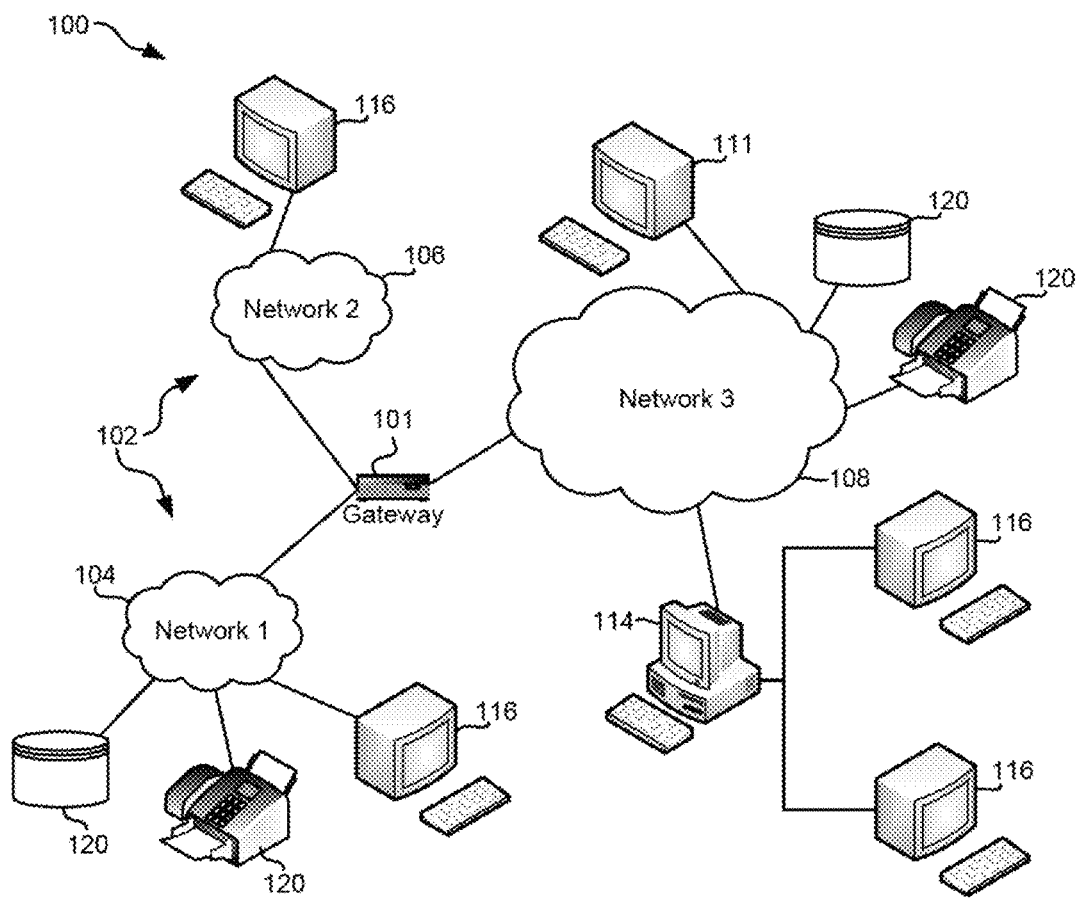
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defused in dictionaries, treatises, etc.

It must also be noted that, as used in the specification and the appended claims, the singular forms "a," "an," and "the" include plural referents unless otherwise specified.

In one approach, routing capability may be added to a virtual switch enabled by a Transparent Interconnection of Lots of Links (TRILL)-based fabric network. In brief, the control plane of routing may be centralized on one of the switches, or two switches if high availability (HA) is specified. Also, the routing interface may be virtual local area network (ULAN) based, the data plane for routing may be distributed to all the Routing Bridges (RBridges), enabled on all the access ports, and Address Resolution Protocol (ARP) proxy for Virtual Router Redundancy Protocol (VRRP) internet protocol (IP) addresses may be enabled on all the server-facing access ports. With this approach, the virtual switch may have routing support and the routing of the data frames may be performed in a distributed fashion, the routing of east-west traffic will occur right on the server-facing ports at ingress thereby reducing the number of hops required for routing of such traffic, and this approach is interoperable with t-LAG, a Distributed Multi-Link Trunking (DMLT) mechanism that allows external switches or servers to connect in a Link Aggregation Group (LAG) to the virtual switch enabled by a TRILL-based fabric.

In one general embodiment, a system includes a first routing protocol engine (RPE) RBridge which includes a local uplink port adapted to be coupled to a router, a local processor for executing logic, logic adapted for receiving a data frame at the local uplink port, logic adapted for running routing protocols to enable layer-3 (L3) processing of the data frame, and logic adapted for configuring learned routes and routes passed from another RPE RBridge in the local processor.

In another general embodiment, a system includes a first RPE RBridge and a first non-RPE RBridge arranged in a link aggregation group (LAG) cluster with the first RPE RBridge. The first RPE RBridge includes a first local access port adapted to be coupled to a first server, a second local access port adapted to be coupled to a second server, a local processor for executing logic, logic adapted for receiving a data frame at either local access port, logic adapted for running routing protocols to enable L3 processing of the data frame, and logic adapted for configuring learned routes and routes passed from another RPE RBridge in the local processor of the first RPE RBridge. The first non-RPE RBridge includes a first local access port adapted to be coupled to the first server, a second local access port adapted to be coupled to the second server, a local processor for executing logic, logic adapted for receiving a data frame at the local access port, and logic adapted for configuring learned routes and routes passed from any RPE RBridges in the local processor of the first non-RPE RBridge.

In yet another general embodiment, a method for providing L3 processing in a transparent interconnection of lots of links (TRILL)-enabled network includes receiving a data frame at a local uplink port of a first RBridge enabled with a RPE to enable L3 processing, wherein the first RPE RBridge is connected to a router, running routing protocols to provide L3 processing of the data frame, and configuring learned routes and routes passed from any other RPE RBridges.

In accordance with another general embodiment, a method for providing L3 processing in a TRILL-enabled network includes receiving a data frame at a first RBridge enabled with a RPE to enable L3 processing, wherein the first RPE RBridge is connected to a first server via a first local access port and to a second server via a second local access port, running routing protocols to provide L3 processing of the data frame, and configuring learned routes and routes passed from any other RPE RBridges.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
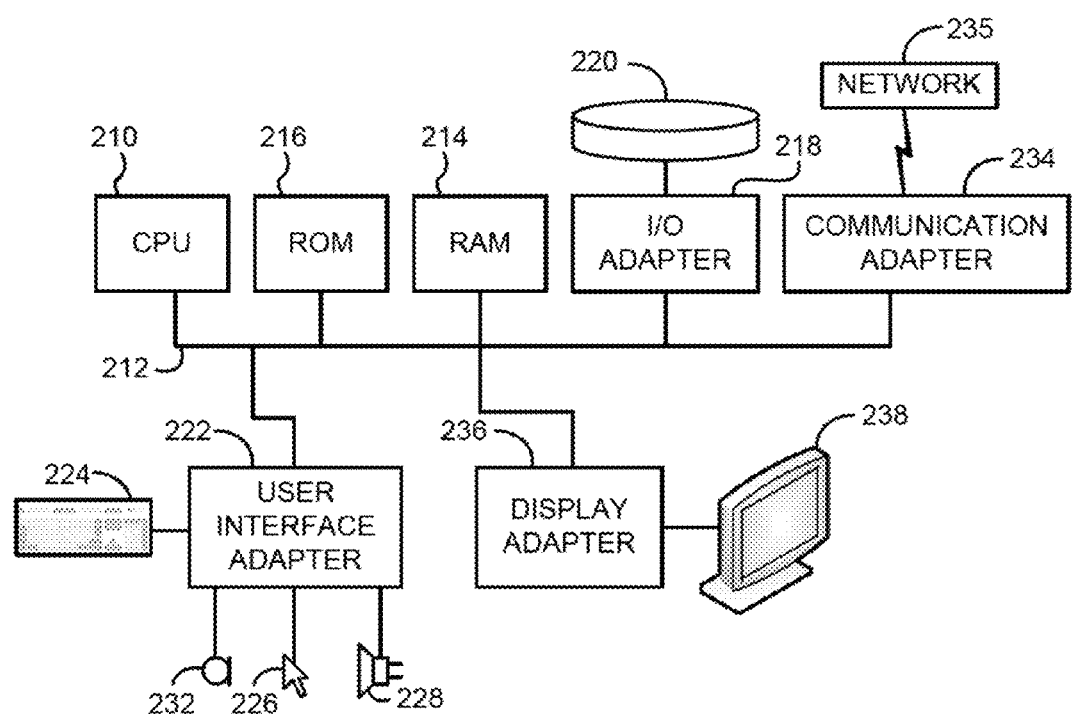
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 4A:
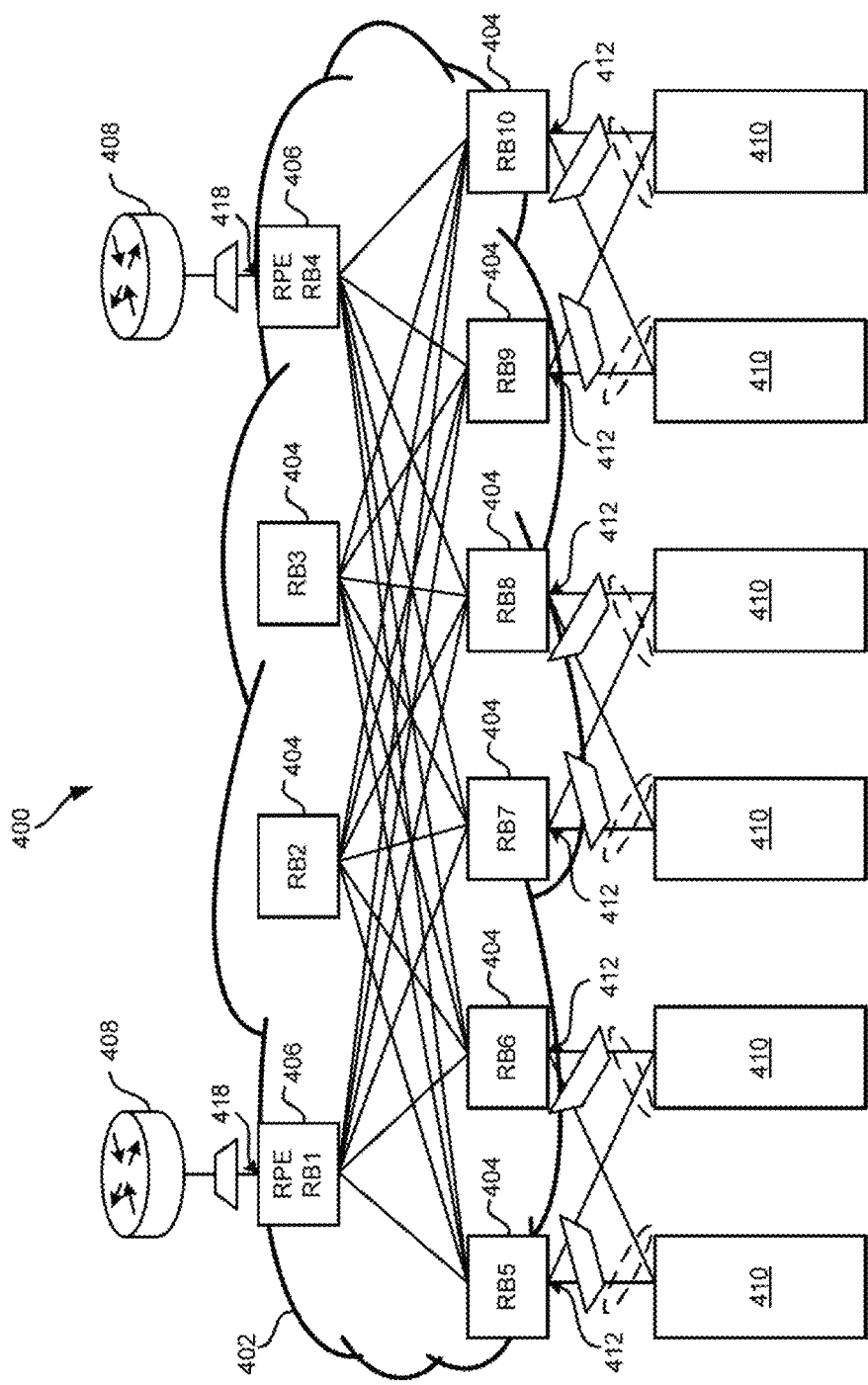
FIGS. 4A-4D show a simplified TRILL-enabled network and components thereof, according to various embodiments.

Now referring to FIG. 4A, a system 400 is shown that is capable of efficient L3 support in a TRILL-based fabric network 402. In this system 400, RBridges 404 may be used to interconnect routers 408 to servers 410. However, in this embodiment, RBridges 406 that have local uplink ports 418 are adapted for running routing protocols that enable L3 support across the TRILL-based fabric network 402 and are denoted as having a routing protocol engine (RPE). In one approach, this may be accomplished using conventional RBridge hardware, with software changes to enable routing protocols to be executed by a local processor of the RBridge 406 to enable routing, which may rely upon a TRILL extension.

The routing (denoted by the trapezoidal shapes) is enabled on all access ports in the virtual switch (e.g., in all the RBridges 404, 406 on an edge of the TRILL network 402 since the entire system 400 appears as a single switch). Furthermore, ARP Proxy is enabled for VRRP IP addresses on all server-facing ports 412. According to one approach, the servers 410 may use one VRRP IP as a default gateway.

In one approach, the routing interfaces may be VLAN-based. Furthermore, all of the RPE RBridges 406 may pass the routes they have learned to all the other non-RPE RBridges 404. It is a duty of each RBridge 404, 406 to configure its local processors for routes learnt or passed from the RPE RBridges 406.

Figure 4B:
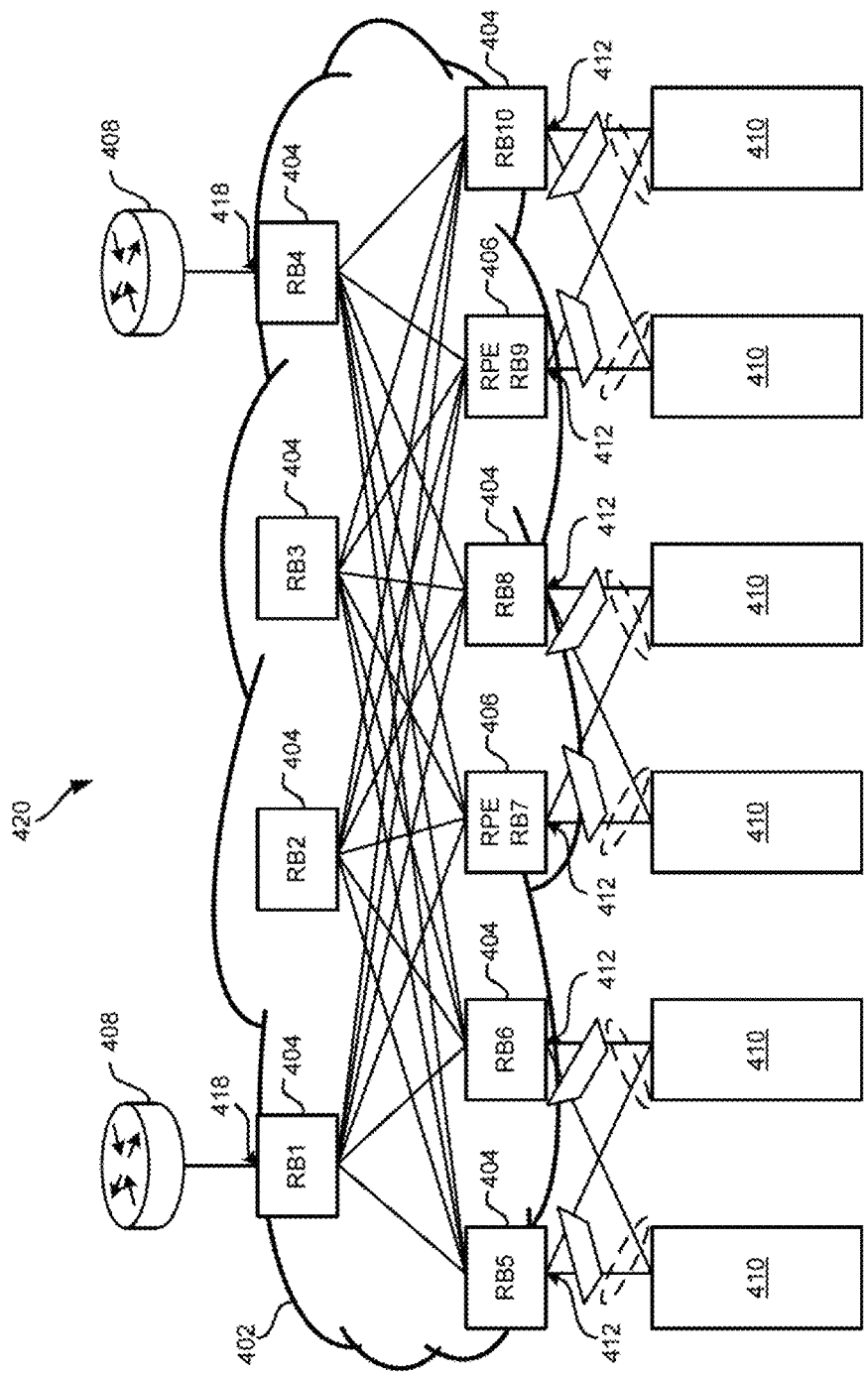

Now referring to FIG. 4B, a system 420 is shown that is capable of efficient L3 support in a TRILL-based fabric network 402. In this system 420, RBridges 404 may be used to interconnect routers 408 to servers 410. However, in this embodiment, one switch or two switches, such as RBridges 406 may be selected and adapted for running routing protocols that enable L3 support across the TRILL-based fabric network 402 and are denoted as RPE. It does not matter if the switches are RBridges, and two switches may be selected for high availability (HA) applications. In one approach, this may be accomplished using conventional RBridge hardware, with software changes to enable routing protocols to be executed by a local processor of the RBridge 406 to enable routing, which may rely upon a TRILL extension.

When two switches are selected for running routing protocols, one is the primary, and the other is the secondary. Should the primary fail, the secondary will take over the duties of running routing protocols. In order to effectuate this changeover, a heartbeat mechanism (or some other similar mechanism) may be enabled between the primary and secondary RPE switches such that each switch is aware of whether the other switch is still sending out the heartbeat signal. Should the primary stop sending the heartbeat signal, the secondary may take over the routing duties.

The routing is enabled only on server-facing access ports 412 in the virtual switch (e.g., only in RBridges 404, 406 that have access ports that face the servers 410). Furthermore, ARP Proxy is enabled for VRRP IP addresses on all server-facing ports 412. According to one approach, the servers 410 may share the same VRRP IP addresses as the upstream routers 408, and the servers 410 may use one VRRP IP address as the default gateway.

In one approach, the routing interfaces will be VLAN-based. Furthermore, the primary RPE RBridge 406 may be responsible for passing the routes it has learned to all the other non-RPE RBridges 404. It is a duty of each RBridge 404, 406 to configure its local processors for routes learnt or passed from the primary RPE RBridge 406. In an alternative approach, both the primary and secondary RPE RBridges 406 may pass the routes it has learned to all the other non-RPE RBridges 404.

Figure 4C:
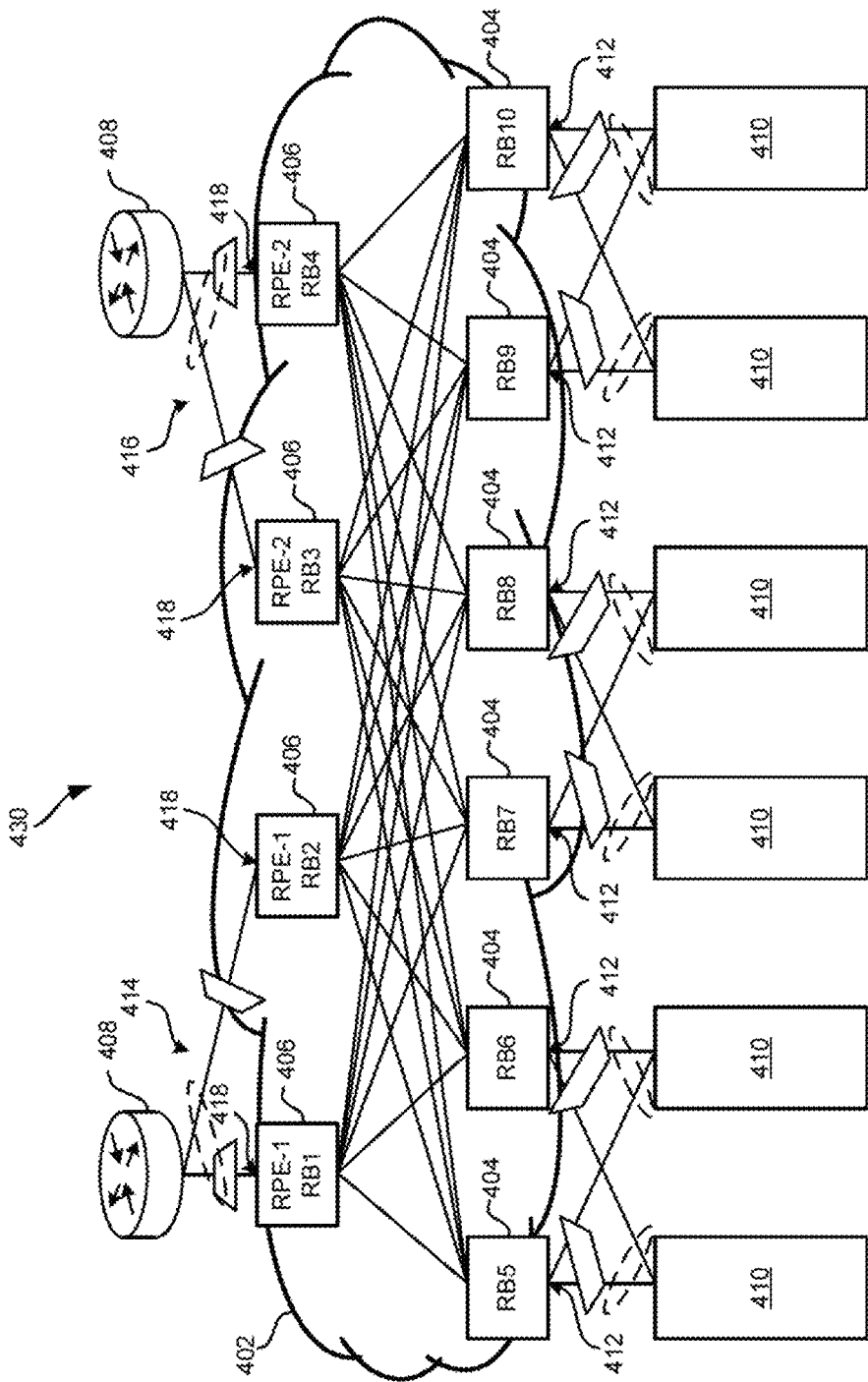

Now referring to FIG. 4C, a system 430 is shown that is capable of efficient L3 support in a TRILL-based fabric network 402. In this system 430, RBridges 404, 406 may be used to interconnect routers 408 to servers 410. However, in this embodiment, RBridges 406 that have local uplink ports 418 that are connected to the routers 408 may be adapted for running routing protocols that enable L3 support across the TRILL-based fabric network 402 and are denoted as RPE-1 or RPE-2. Furthermore, these RBridges 406 may be grouped together in a t-LAG configuration, and therefore may cooperate together to act as one. Two sets 414, 416 of these t-LAG clusters may be selected, one as primary (denoted as RPE-1), and one as secondary (denoted as RPE-2). In one approach, this may be accomplished using conventional RBridge hardware, with software changes to enable routing protocols to be executed by a local processor of the RBridge 406 to enable routing, which may rely upon a TRILL extension.

In one approach, if routing protocols are enabled on any other RBridges 404 that do not have uplink ports, a relay agent on the RBridges 406 may be implemented to relay the routing packets received from the upstream routers 408, such as if Border Gateway Protocol (BGP) is used.

When the two sets of RBridges 414, 416 are selected for running routing protocols, one is the primary RPE-1, and the other is the secondary RPE-2 to provide a HA arrangement. Should the primary fail, the secondary will take over the duties of running routing protocols. In order to effectuate this changeover, a heartbeat mechanism (or some other similar mechanism) may be enabled between the primary RPE-1 RBridges 414 and the secondary RPE-2 RBridges 416 such that each t-LAG cluster of RBridges is aware of whether the other t-LAG cluster of RBridges is still sending out the heartbeat signal. Should the primary stop sending the heartbeat signal, the secondary may take over the routing duties.

The routing is enabled on all access ports in the virtual switch (e.g., all server-facing ports 412 on the RBridges 404). Furthermore, ARP Proxy is enabled for VRRP IP addresses on all server-facing ports 412.

In one approach, the routing interfaces may be VLAN-based. Furthermore, all of the RPE RBridges 406 may pass the routes they have learned to all the other non-RPE RBridges 404. It is a duty of each RBridge 404, 406 to configure its local processors for routes learnt or passed from the RPE RBridges 406.

Figure 4D:
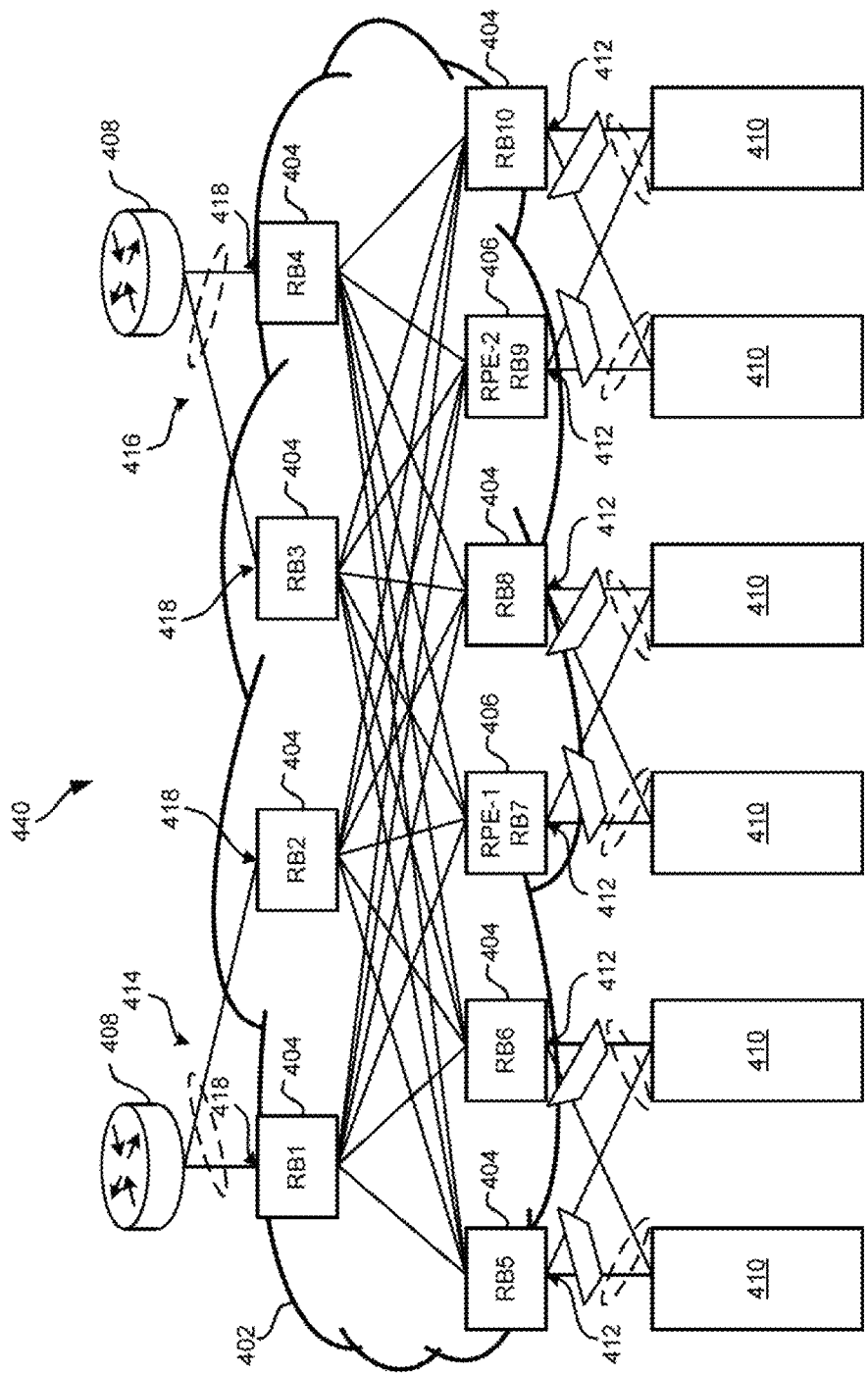

Now referring to FIG. 4D, a system 440 is shown that is capable of efficient L3 support in a TRILL-based fabric network 402. In this system 440 RBridges 404, 406 may be used to interconnect routers 408 to servers 410. However, in this embodiment, one or more RBridges 406 that have server-facing ports 412 that are connected to the servers 410 may be adapted for running routing protocols that enable L3 support across the TRILL-based fabric network 402. In the embodiment shown in FIG. 4D, two RBridges 406 are denoted as RPE-1 and RPE-2 to represent a primary and a secondary RBridge, respectively, for running routing protocols in a HA arrangement. In one approach, this may be accomplished using conventional RBridge hardware, with software changes to enable routing protocols to be executed by a local processor of the RBridge 406 to enable routing, which may rely upon a TRILL extension.

When two RBridges 406 RPE-1 and RPE-2 are selected for running routing protocols, one is the primary RPE-1, and the other is the secondary RPE-2. Should the primary fail, the secondary will take over the duties of running routing protocols. In order to effectuate this changeover, a heartbeat mechanism (or some other similar mechanism) may be enabled between the primary RPE-1 RBridge 406 and the secondary RPE-2 RBridge 406 such that each RBridge is aware of whether the other RBridge is still sending out the heartbeat signal. Should the primary stop sending the heartbeat signal, the secondary may take over the routing duties.

Furthermore, any two RBridges may be grouped together in a Link Aggregation Group (LAG) configuration (or a t-LAG configuration for RBridges that have uplink ports 418 that are connected to the routers 408) and therefore may cooperate together to act as one.

The routing is enabled only on server-facing access ports 412 in the virtual switch (e.g., only in RBridges 404, 406 that have access ports that face the servers 410). Furthermore, ARP Proxy is enabled for VRRP IP addresses on all server-facing ports 412. According to one approach, the RPE RBridges 406 may share the same VRRP IP addresses as the upstream routers 408.

In one approach, the routing interfaces will be VLAN-based. Furthermore, the primary RPE RBridge RPE-1 may pass the routes it has learned to all the other non-RPE RBridges 404 or both the primary RPE-1 and secondary RPE-2 RPE RBridges 406 may pass the routes they have learned to all the other non-RPE RBridges 404. It is a duty of each RBridge 404, 406 to configure its local processors for routes learnt or passed from the RPE RBridge(s) 406.

Now, packet flows are described according to the various embodiments shown in FIGS. 4A-4D. For north-south traffic (e.g., packet traffic which moves from the routers 408 to the servers 410 across the TRILL-enabled network 402), the routing is performed on the uplink access port(s) 418 at ingress in the embodiments shown in FIGS. 4A and 4C and the routing is performed by the upstream routers 408 for the embodiments shown in FIGS. 4B and 4D. For south-to-north (e.g., packet traffic which moves from the servers 410 to the routers 408 across the TRILL-enabled network 402), and/or east-west (and west-east) traffic, the routing is performed by the server-facing port(s) 412 at ingress, for the embodiments shown in FIGS. 4A-4D.

In FIGS. 4A and 4C, the uplink access port(s) 418 carry just those specific VLANs for routing, which are usually different from those configured on the virtual switch. The routing interfaces for these uplink access port(s) 418 may be either port or VLAN-based. In FIGS. 4B and 4D, the uplink access port(s) 418 carry all the VLANs configured on the virtual switch, if routing is used on those VLANs. The routing interfaces for these uplink access port(s) 418 are VLAN-based.

A custom or improved network chipset may be used in the RPE RBridges 406 which runs routing protocols. This network chipset is adapted to support L3 and TRILL processing at the same time, for the same port, and on the same VLAN. L3 processing is performed first, and then bridging or TRILL encapsulation is performed, in one approach.

Figure 5:
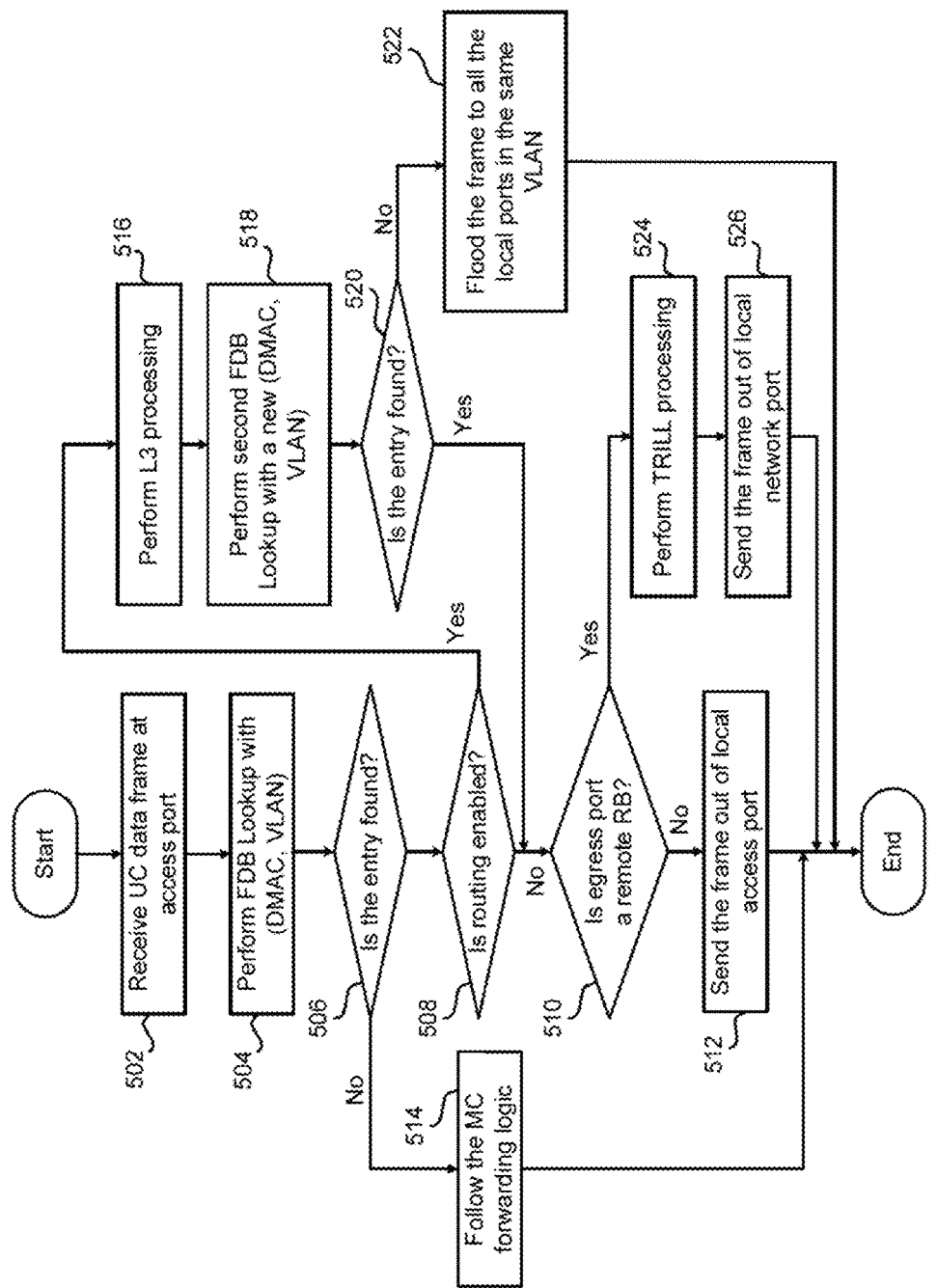
FIG. 5 shows a flowchart of a method, according to one embodiment.
Figure 6:
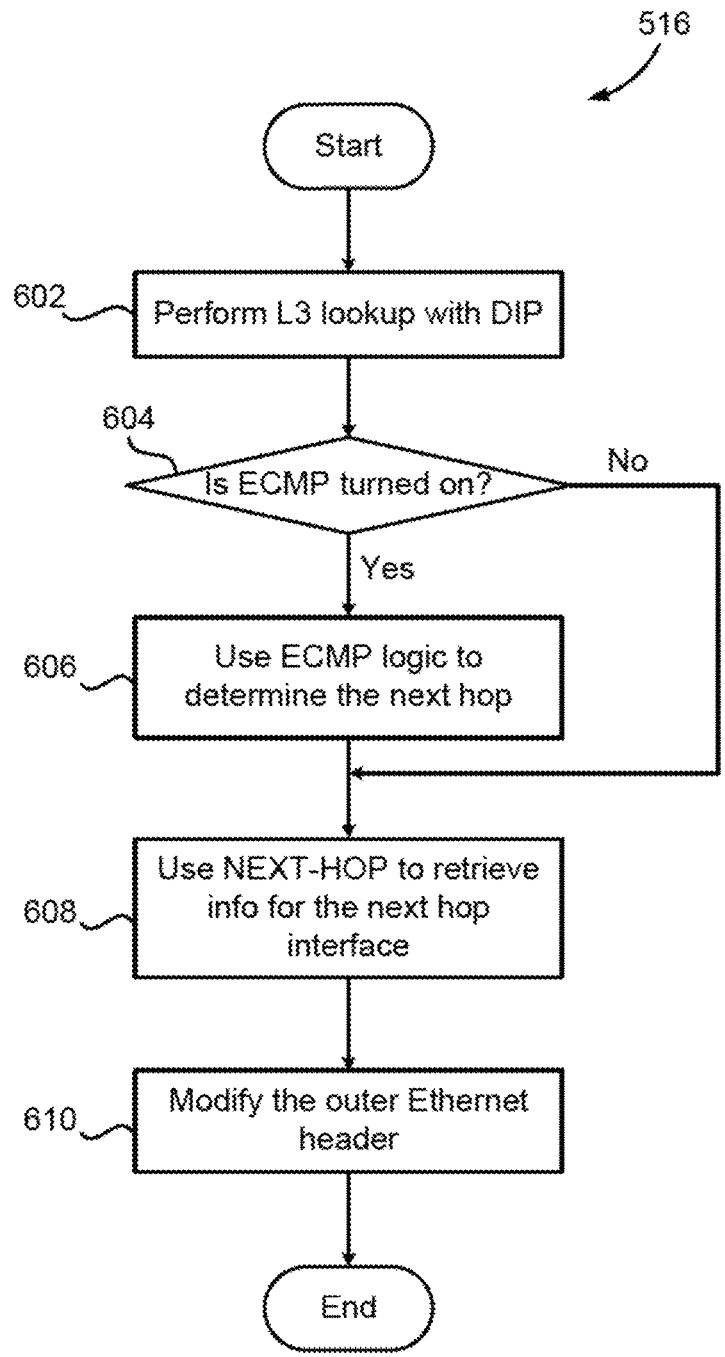
FIG. 6 shows a flowchart of a method, according to one embodiment.
Figure 7:
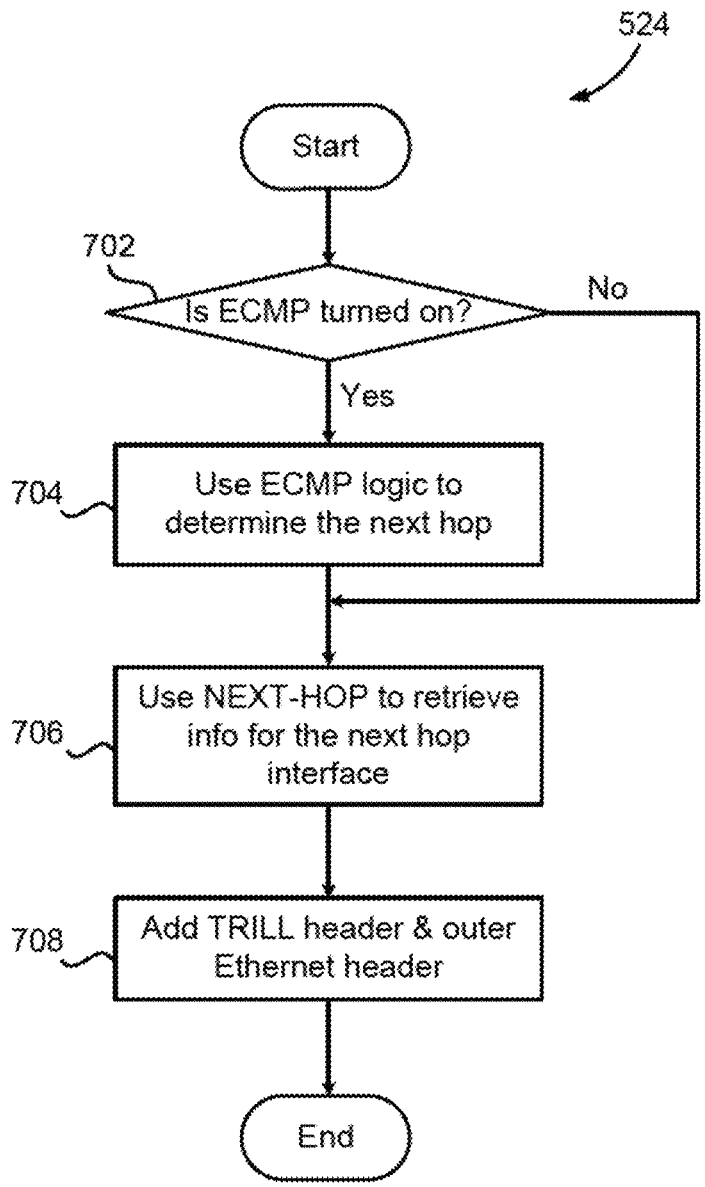
FIG. 7 shows a flowchart of a method, according to one embodiment.

FIGS. 5-7 show flow charts for packet processing on an attached port at ingress, according to various embodiments. As shown in FIG. 5, a method 500 for unicast (UC) packet forwarding at an access port is shown according to one embodiment. Method 500 may be carried out in any suitable device, such as a RBridge, router, switch, server, etc.

In operation 502, a UC data frame is received at an access port of a RBridge.

In operation 504, lookup is performed on a forwarding database (FDB) with a designated VLAN or destination media access control (MAC) address, referred to as a DMAC.

In operation 506, if the entry is found in the FDB, the method 500 continues on to operation 508; otherwise, the method 500 proceeds to operation 514.

In operation 508, it is determined if routing is enabled at the access port, and if routing is not enabled, the method 500 continues to operation 510; otherwise (e.g., routing is enabled), the method proceeds to operation 516.

In operation 510, it is determined if the egress port is a remote RBridge. If the egress port is not a remote RBridge, then the method 500 continues to operation 512; otherwise (e.g., the egress port is a remote RBridge), the method 500 proceeds to operation 524.

In operation 512, the frame is sent out of the local access port, and the method 500 is ended.

In operation 514, when the entry is not found in the FDB, multicast (MC) forwarding logic is followed to process the data frame, and the method 500 is ended.

In operation 516, when it is determined that routing is enabled at the access port, L3 processing of the data frame is performed in order to obtain an inner packet.

In operation 518, a second FDB lookup is performed with a VLAN/DMAC from the inner packet.

In operation 520, if the entry is found during the second FDB lookup, the method 500 continues to operation 510; otherwise, the method 500 proceeds to operation 522.

In operation 522, the data frame is flooded to all the local ports in the same VLAN designated in the inner packet, and the method 500 is ended.

In operation 524, when the egress port is determined to be a remote RBridge, TRILL processing is performed on the data frame.

Then, in operation 526, the data frame is sent out of a local network port, and the method 500 is ended.

Now referring to FIG. 6, L3 processing (operation 516 of method 500 in FIG. 5) is described in more detail, according to one approach. Referring again to FIG. 6, in operation 602, L3 lookup is performed with a destination IP address, referred to as a DIP, which is obtained from the data frame.

In operation 604, if the Equal Cost Equal Path (ECMP) routing is turned on, the method continues to operation 606; otherwise, the method 600 proceeds to operation 608.

In operation 606, the ECMP logic is used to determine a next hop for the data frame, and the method continues to operation 608.

In operation 608, NEXT-HOP is used to retrieve information needed for the next hop interface.

In operation 610, an outer Ethernet header of the data frame is modified to prepare the data frame to be sent according to the next hop.

Now referring to FIG. 7, TRILL processing (operation 524 of method 500 in FIG. 5) is described in more detail, according to one approach. Referring again to FIG. 7, in operation 702, it is determined if the ECMP routing is turned on. If ECMP is turned on, the method 700 proceeds to operation 704; otherwise, the method 700 continues to operation 706.

In operation 704, the ECMP logic is used to determine a next hop for the data frame and the method continues to operation 706.

In operation 706, NEXT-HOP is used to retrieve information needed for the next hop interface.

In operation 708, a TRILL header and an outer Ethernet header are added to the data frame, and the method 700 is ended.

Figure 8:
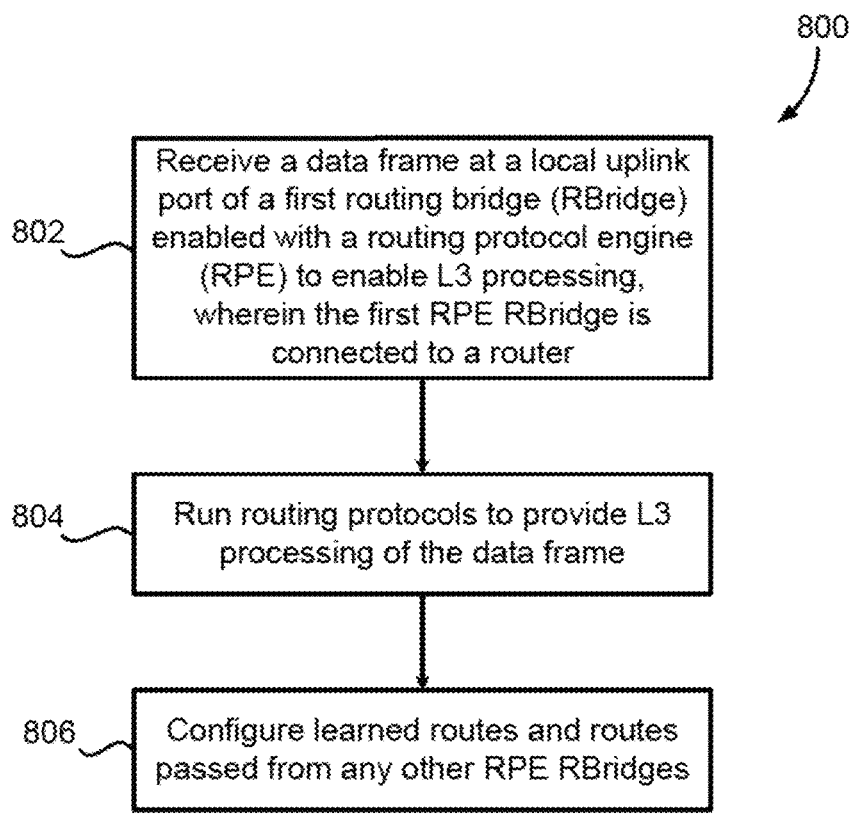
FIG. 8 is a flowchart of a method for providing L3 processing in a TRILL-enabled network, according to one embodiment.

Now referring to FIG. 8, a flowchart of a method 800 for providing L3 processing in a TRILL-enabled network is shown, according to one embodiment. The method 800 may be performed in accordance with the present invention in any of the environments depicted in FIGS. 1-2, and 4-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in one embodiment, the method 800 may be partially or entirely performed by a RBridge, a processor (such as a CPU, an ASIC, an FPGA, etc.), or any other suitable device.

As shown in FIG. 8, method 800 may initiate with operation 802, where a data frame is received at a local uplink port of a first RBridge enabled with a RPE to enable L3 processing. In method 800, the first RPE RBridge is connected to a router via the local uplink port.

In operation 804, routing protocols are run on the first RPE RBridge to provide L3 processing of the data frame.

In optional operation 806, learned routes and routes passed from any other RPE RBridges are configured, such as in a local processor of the first RPE RBridge.

The method 800, in accordance with some embodiments, may further comprise one or more of the following: enabling routing on all access ports on the first RPE RBridge and any non-RPE RBridges, passing routes which are learned through L3 processing of the data frame to any non-RPE RBridges in the TRILL-enabled network, and/or configuring learned routes and routes passed from the first RPE RBridge in other non-RPE RBridges in the TRILL-enabled network.

In more embodiments, the method 800 may further comprise one or more of the following: enabling ARP proxy for VRRP IP addresses on all server-facing ports of any non-RPE RBridges, using one VRRP IP address as a default gateway for any servers connected to the TRILL-enabled network, and/or forming a LAG cluster, such as a t-LAG cluster, comprising the first RPE RBridge and a second RPE RBridge connected to the router. In addition, all routing interfaces are VLAN based in one approach.

The method 800 may be performed, in various embodiments comprising all or some of the operations described in FIG. 8, in computer program products, other methods, logic, and/or systems.

In one such embodiment, a computer program product for providing L3 processing in a TRILL-enabled network comprises a computer readable storage medium having computer readable program code embodied therewith, the computer readable program code comprising computer readable program code configured for executing method 800 and possibly executing some of the further embodiments of method 800 described herein.

Figure 3:
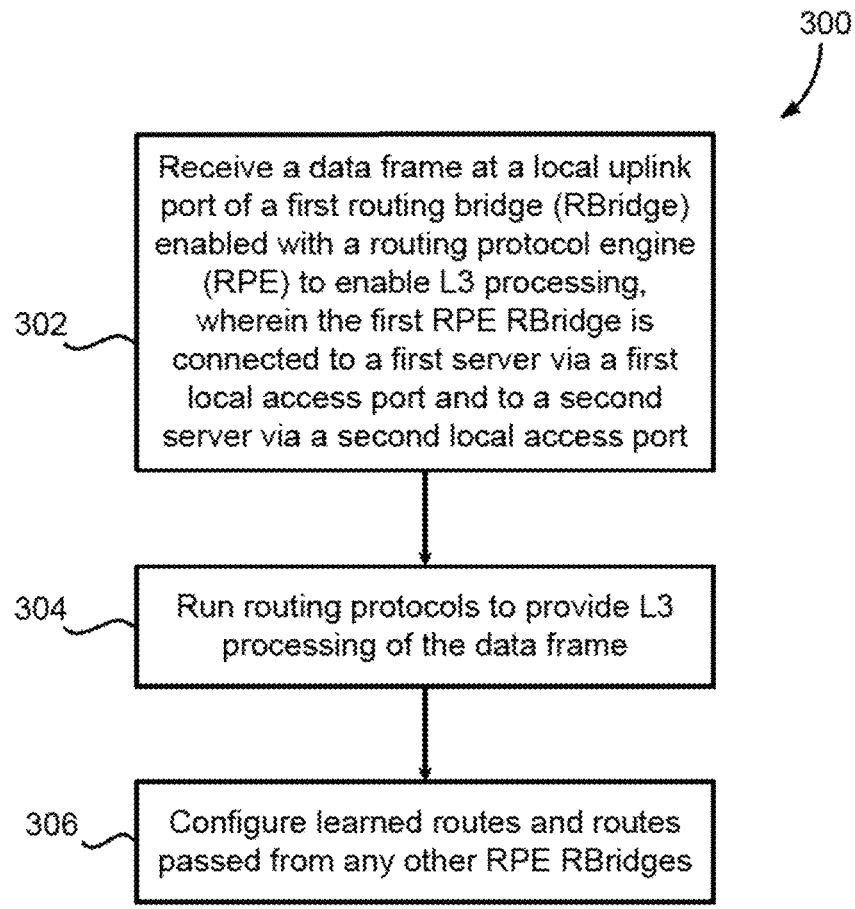
FIG. 3 is a flowchart of a method for providing Layer-3 (L3) processing in a transparent interconnection of lots of links (TRILL)-enabled network, according to one embodiment.

Now referring to FIG. 3, a flowchart of a method 300 for providing L3 processing in a TRILL-enabled network is shown, according to one embodiment. The method 300 may be performed in accordance with the present invention in any of the environments depicted in FIGS. 1-2, and 4-7, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in one embodiment, the method 300 may be partially or entirely performed by a RBridge, a processor (such as a CPU, an ASIC, an FPGA, etc.), or any other suitable device.

As shown in FIG. 3, method 300 may initiate with operation 302, where a data frame is received at a local uplink port of a first RBridge enabled with a RPE to enable L3 processing. In method 300, the first RPE RBridge is connected to a first server via a first local access port and to a second server via a second local access port.

In operation 304, routing protocols are run on the first RPE RBridge to provide L3 processing of the data frame.

In optional operation 306, learned routes and routes passed from any other RPE RBridges are configured, such as in a local processor of the first RPE RBridge.

In accordance with one embodiment, the method 300 may further comprise forming a LAG cluster comprising the first RPE RBridge and a second RPE RBridge connected to the first server and a second server.

In more embodiments, the method 300 may further comprise one or more of the following: enabling routing only on server-facing access ports on any RPE RBridges and any non-RPE RBridges, passing routes which are learned through L3 processing of the data frame to any non-RPE RBridges in the TRILL-enabled network, and/or configuring learned routes and routes passed from the first RPE RBridge in other non-RPE RBridges in the TRILL-enabled network.

In even more approaches, the method 300 may comprise one or more of: enabling ARP proxy for VRRP IP addresses on all server-facing ports of any RPE RBridges and any non-RPE RBridges, using an upstream router's VRRP IP address for any RPE RBridges, and/or forming LAG clusters for any upstream routers, such as t-LAG clusters, each LAG cluster comprising two non-RPE RBridges that are connected to a common router.

The method 300 may be performed, in various embodiments comprising all or some of the operations described in FIG. 3, in computer program products, other methods, logic, and/or systems.

In one such embodiment, a computer program product for providing L3 processing in a TRILL-enabled network comprises a computer readable storage medium having computer readable program code embodied therewith, the computer readable program code comprising computer readable program code configured for executing method 800 and possibly executing some of the further embodiments of method 300 described herein.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a first routing protocol engine (RPE) routing bridge (RBridge), comprising:
one or more local uplink ports configured to be coupled to a non-RBridge router; and
a local processor for executing first logic, the first logic being configured to:
receive one or more data frames at the one or more local uplink ports;
run routing protocols to enable layer-3 (L3) processing of the one or more data frames; and
configure learned routes and routes passed from another RPE RBridge in the local processor; and
a second RPE RBridge configured to serve as a backup to the first RPE RBridge, the second RPE RBridge comprising:
one or more second local uplink ports configured to be coupled to the non-RBridge router;
a local processor for executing second logic, the second logic being configured to:
receive data frames at the one or more second local uplink ports;
run routing protocols to enable L3 processing of the data frames; and
configured learned routes and routes passed from another RPE RBridge in the local processor,
wherein the first RPE RBridge and the second RPE RBridge are configured to be arranged in a first link aggregation group (LAG) cluster with the non-RBridge router, and
wherein only the local uplink ports on the first RPE RBridge and the second RPE RBridge, to the exclusion of all other ports on the first RPE RBridge and the second RPE RBridge, are configured to run routing protocols that enable L3 support across the TRILL-enabled network.

2. The system as recited in claim 1, further comprising a transparent interconnection of lots of links (TRIM-enabled network, comprising:
a plurality of non-RPE RBridges, each non-RPE RBridge comprising:
a local processor for executing logic, the logic being configured to:
couple to two servers in a third LAG cluster with the first RPE RBridge or a non-RPE RBridge, the third LAG cluster comprising two non-RPE RBridges or the first RPE RBridge and a non-RPE RBridge for each of the two servers; and
configure learned routes and routes passed from any RPE RBridge in the local processor of the non-RPE RBridge.

3. The system as recited in claim 2, wherein address resolution protocol (ARP) proxy is enabled for virtual router redundancy protocol (VRRP) internet protocol (IP) addresses on all server-facing ports of the non-RPE RBridges, and wherein the servers use one VRRP IP address as a default gateway.

4. The system as recited in claim 2, wherein all access ports on each of the RPE RBridges and each of the non-RPE RBridges have routing enabled, wherein routing interfaces are virtual local area network (VLAN) based, and wherein each RPE RBridge passes routes which have been learned to each of the non-RPE RBridges.

5. The system as recited in claim 1, wherein the first logic is further configured to directly couple the first RPE RBridge to two servers of a plurality of servers in a second LAG cluster with a second RBridge, the second LAG cluster comprising the first RPE RBridge and the second RBridge for each of the two servers, wherein each RBridge in the second LAG cluster is directly connected to both of the two servers without any intervening device therebetween.

6. The system as recited in claim 1, wherein the second logic is further configured to directly couple the second RPE RBridge to two servers of a plurality of servers in a fourth LAG cluster with the first RPE RBridge, the fourth LAG cluster comprising the first RPE RBridge and the second RPE RBridge for each of the two servers, wherein the first RPE RBridge and the second RPE RBridge in the fourth LAG cluster are directly connected to both of the two servers without any intervening device therebetween.

7. The system as recited in claim 1, further comprising a fifth LAG cluster of RPE RBridges configured to be coupled to a second non-RBridge router, wherein the fifth LAG cluster serves as a backup to the first LAG cluster, wherein only local uplink ports on the RPE RBridges in the fifth LAG cluster, to the exclusion of all other ports on the RPE RBridges in the fifth LAG cluster, are configured to run routing protocols that enable L3 support across the TRILL-enabled network.

8. A system, comprising:
a first routing protocol engine (RPE) routing bridge (RBridge), comprising:
a first local access port configured to be coupled to a first server;
a second local access port configured to be coupled to a second server;
one or more local uplink ports configured to be coupled to a non-RBridge router in a first link aggregation group (LAG) cluster with a second RPE RBridge; and
a local processor for executing logic, the logic being configured to:
receive a data frame at either local access port;
run routing protocols to enable layer-3 (L3) processing of the data frame;
directly couple to the first and second servers in a second LAG cluster with a second RPE RBridge or a non-RPE RBridge, the second LAG cluster comprising the first and second servers, the first RPE RBridge, and another RBridge, wherein each RBridge in the second LAG cluster is directly connected to the first server and the second server without any intervening device therebetween; and
configure learned routes and routes passed from another RPE RBridge in the local processor of the first RPE RBridge; and
a first non-RPE RBridge arranged in a third LAG cluster with the first RPE RBridge, wherein the first non-RPE RBridge comprises:
a first local access port configured to be coupled to the first server;
a second local access port configured to be coupled to the second server;
a local processor for executing logic, the logic being configured to:
receive a data frame at the local access port;
couple to the first and second servers in a fourth LAG cluster with a RPE RBridge or a non-RPE RBridge, the fourth LAG cluster comprising the first and second servers, the first non-RPE RBridge, and another RBridge, wherein each RBridge in the fourth LAG cluster is connected to the first server and the second server;
send the data frame to the first RPE RBridge to enable L3 processing of the data frame; and
configure learned routes and routes passed from any RPE RBridges in the local processor of the first non-RPE RBridge,
wherein only the local uplink ports on the first RPE RBridge and the second RPE RBridge, to the exclusion of all other ports on the first RPE RBridge and the second RPE RBridge, are configured to run routing protocols that enable L3 support across a transparent interconnection of lots of links (TRILL)-enabled network.

9. The system as recited in claim 8, further comprising the TRILL-enabled network, the TRILL-enabled network comprising:
a plurality of non-RPE RBridges, each non-RPE RBridge comprising:
a local processor for executing logic, the logic being configured to:
couple to two servers via two access ports in LAG clusters comprising two non-RPE RBridges for each two servers;
send data frames received on access ports to a RPE RBridge to enable L3 processing of the data frames; and
configure learned routes and routes passed from any RPE RBridge in the local processor of the non-RPE RBridge.

10. The system as recited in claim 9, wherein address resolution protocol (ARP) proxy is enabled for virtual router redundancy protocol (VRRP) internet protocol (IP) addresses on all server-facing access ports of the RPE RBridges and the non-RPE RBridges, and wherein the RPE RBridges share the non-RBridge router's VRRP IP address.

11. The system as recited in claim 9, wherein each non-RBridge router is coupled to two RPE RBridges in a LAG cluster.

12. The system as recited in claim 9, wherein routing interfaces are virtual local area network (VLAN) based, and wherein each RPE RBridge passes routes which have been learned to each of the non-RPE RBridges.

13. The system as recited in claim 8, further comprising the second RPE RBridge, the second RPE RBridge comprising:
a local access port configured to be coupled to a server;
a local processor for executing logic, the logic being configured to:
receive data frames at the local access port;
run routing protocols to enable L3 processing of the data frames; and
configure learned routes and routes passed from another RPE RBridge in the local processor,
wherein the second RPE RBridge is arranged in a sixth LAG duster with a second non-RPE RBridge, and wherein the second RPE RBridge serves as a backup to the first RPE RBridge.

14. A method for providing layer-3 (L3) processing in a transparent interconnection of lots of links (TRILL)-enabled network, the method comprising:
receiving a data frame at a local uplink port of a first routing bridge (RBridge) enabled with a routing protocol engine (RPE) to enable L3 processing, wherein the first RPE RBridge is directly connected to a non-RBridge router;
running routing protocols to provide L3 processing of the data frame;
forming a first link aggregation group (LAG) cluster comprising the first RPE RBridge, the non-RBridge router, and a second RPE RBridge, wherein the second RPE RBridge in the first LAG is also directly connected to the non-RBridge router without any intervening device therebetween; and
configuring learned routes and routes passed from any other RPE RBridges in local processors of the first and second RPE RBridges,
wherein only the local uplink ports on the first RPE RBridge and the second RPE RBridge, to the exclusion of all other ports on the first RPE RBridge and the second RPE RBridge, are configured to run routing protocols that enable L3 support across the TRILL-enabled network.

15. The method as recited in claim 14, further comprising:
enabling routing on all access ports on the first RPE RBridge;
passing routes which are learned through L3 processing of the data frame to any non-RPE RBridges in the TRILL-enabled network; and
configuring learned routes and routes passed from the first RPE RBridge in other non-RPE RBridges in the TRILL-enabled network.

16. The method as recited in claim 14, further comprising:
enabling address resolution protocol (ARP) proxy for virtual router redundancy protocol (VRRP) interact protocol (IP) addresses on all server-facing ports of any non-RPE RBridges; and
using one VRRP IP address as a default gateway for any servers connected to the TRILL-enabled network,
wherein all routing interfaces are virtual local area network (VLAN) based.

17. The method as recited in claim 14, wherein the first LAG cluster comprises the first RPE RBridge and the second RPE RBridge connected to the non-RBridge router, wherein the second RPE RBridge is configured to serve as a backup to the first RPE RBridge.

18. A computer program product for providing L3 processing in the TRILL-enabled network, the computer program product comprising a non-transitory computer readable storage medium having computer readable program code embodied therewith, the computer readable program code comprising computer readable program code configured for executing the method as recited in claim 14.

19. A method for providing layer-3 (L3) processing in a transparent interconnection of lots of links (TRILL)-enabled network, the method comprising:
receiving a data frame at a first routing bridge (RBridge) enabled with a routing protocol engine (RPE) to enable L3 processing, wherein the first RPE RBridge is directly connected to a first server via a first local access port and directly connected to a second server via a second local access port;
enabling routing only on local uplink ports, to the exclusion of all other ports, on all RPE RBridges;
running routing protocols to provide L3 processing of the data frame;
forming a first link aggregation group (LAG) cluster comprising the first RPE RBridge, a non-RBridge router, and a second RPE RBridge, wherein the second RPE RBridge in the first LAG is also directly connected to the non-RBridge router without any intervening device therebetween; and
configuring learned routes and routes passed from any other RPE RBridges in local processors of the first and second RPE RBridges.

20. The method as recited in claim 19, further comprising forming a second LAG cluster comprising the first RPE RBridge, the second RPE RBridge, the first server, and the second server, wherein the first RPE RBridge is directly connected to the first server and the second server without any intervening device therebetween, and wherein the second RPE RBridge is directly connected to the first server and the second server without any intervening device therebetween.

21. The method as recited in claim 19, further comprising:
passing routes which are learned through L3 processing of the data frame to any non-RPE RBridges in the TRILL-enabled network; and
configuring learned routes and routes passed from the first RPE RBridge and the second RPE RBridge in other non-RPE RBridges in the TRILL-enabled network.

22. The method as recited in claim 19, further comprising:
enabling address resolution protocol (ARP) proxy for virtual router redundancy protocol (VRRP) Internet protocol (IP) addresses on all server-facing ports of any RPE RBridges and any non-RPE RBridges and
using an upstream non-RBridge router's VRRP IP address for any RPE RBridges.

23. The method as recited in claim 19, further comprising forming link aggregation group (LAG) clusters for any upstream non-RBridge routers, each LAG cluster comprising two RPE RBridges that are connected to a common non-RBridge router.

24. A computer program product for providing L3 processing in the TRILL-enabled network, the computer program product comprising a non-transitory computer readable storage medium having computer readable program code embodied therewith, the computer readable program code comprising computer readable program code configured for executing the method as recited in claim 19.

* * * * *